INVENTORS
ROBERT E. KOZULLA,
BASIL S. SEGRO,
LOUIS B. COURTOT
BY RICHEY, McNENNY & FARRINGTON
ATTORNEYS

United States Patent Office 3,285,627
Patented Nov. 15, 1966

3,285,627
PIPE COUPLING
Robert E. Kozulla, Willowick, Basil S. Segro, Cleveland, and Louis B. Courtot, Euclid, Ohio, assignors to The Weatherhead Company, Cleveland, Ohio, a corporation of Ohio
Filed Feb. 10, 1964, Ser. No. 343,546
9 Claims. (Cl. 285—3)

The present invention relates generally to tubular couplings and more particularly to couplings for closed fluid pressure systems adapted to effect communication between the systems only after the coupling members are connected together in sealing relationship with respect to the atmosphere.

An important use for couplings of this type is in refrigeration systems using a gas as the refrigerating medium. It has been found desirable to eliminate the charging of such systems in the field by manufacturing precharged and sealed units which in the field may be simply connected in place so that the contained charge of refrigerant gas is already in the system. Such units are completely filled and sealed at the factory and the connections between them made automatically at assembly. Therefore, it has been proposed to use couplings which are sealed off from the atmosphere before the connection is made by diaphragms which are easily ruptured when the coupling members are secured together so as to then effect communication between the parts of the system while preventing leakage of the gas to the atmosphere.

It is therefore a principal object of the present invention to provide a novel fluid coupling of the frangible diaphragm type which employs a metal-to-metal seal between the members to prevent leakage to the atmosphere.

It is a further object of this invention to provide a novel fluid coupling of the frangible diaphragm type which effects a metal-to-metal seal between the coupling members prior to rupture of the diaphragm on either member and maintains such metal-to-metal seal at all times during the assembly of the coupling members.

It is a further object of this invention to provide a novel fluid coupling of the frangible diaphragm type which avoids the need for any elastomeric seal in either coupling member.

It is a further object of this invention to provide a novel fluid coupling of the frangible diaphragm type which provides for a minimum of air entrapment between the coupling members after the members are in sealing arrangement and prior to the rupture of the diaphragm on either member.

It is a further object of this invention to provide a novel fluid coupling of the frangible diaphragm type in which leakage of the charge of contained fluid is reduced to a minimum during the assembly of the coupling members.

It is a further object of this invention to provide a novel fluid coupling of the frangible diaphragm type having no loose pieces which can fall out of the coupling or become lost during handling prior to assembly of the two coupling members on their respective tubes.

It is a further object of this invention to provide a novel fluid coupling of the frangible diaphragm type providing a high degree of ease of on-the-job assembly while being of simplified construction to permit low cost of manufacture.

Further objects and advantages of this invention will readily become apparent to those skilled in the art upon a more complete understanding of the preferred embodiment of the invention which is shown in the drawings and described in the following detailed description.

In the drawings:

FIGURE 4 is an end elevational view of the cutter.

Figure 1:
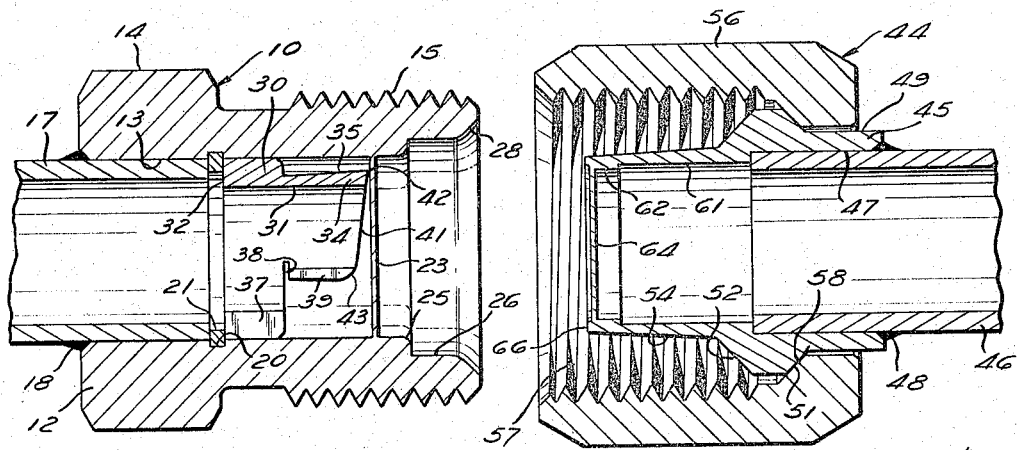
FIGURE 1 is a cross-sectional view of the two members of a coupling according to the preferred embodiment of the invention prior to assembly.

Referring now to the drawings in greater detail, the first or female coupling member 10 includes a body 12 having an axial bore 13 therein. The body is provided with a wrench receiving portion 14 and an externally threaded portion 15. A tube 17 may be attached to the body 12 by insertion into the bore 13 and secured in place by solder as shown at 18. An annular groove 20 is formed in the surface of bore 13 to receive a retaining ring 21 which serves both as a stop to limit the depth of insertion of the tube 17 as well as to retain the cutter 30 in place before the body is attached to a tube.

The body 12 has a thin diaphragm 23 preferably formed integrally with the body itself extending in sealing fashion across the bore 13 a spaced distance from the retaining ring 21. As shown, the diaphragm 23 is made relatively thin and of uniform thickness so that it may be easily cut and punctured while having sufficient strength to retain any pressurized fluid which may be within the tube 17. Outward of the diaphragm 23, the bore 13 has a rounded shoulder 25 which opens into a counterbore 26. At its outer end counterbore 26 in turn opens into a flared conical portion 28.

The cutter 30 is mounted within the bore 13 between the retaining ring 21 and the diaphragm 23. The cutter 30 has an outer diameter substantially the same as that of bore 13 and in turn has a bore or passage 31 extending axially therethrough. One end of the cutter is formed with an end face 32 to abut against the retaining ring 21, while the other end of the cutter 30 is formed with a reduced diameter cutting portion 34. The outer surface 35 of cutting portion 34 is tapered to present a slightly larger diameter adjacent to the diaphragm than away from it. This outer surface 35 is tapered at approximately a two degree angle and provides clearance as will be described in greater detail hereinafter. As shown more particularly in FIGURE 4, the cutter 30 is formed with a longitudinal slot 37 extending from end to end therethrough. A radial slot 38 is formed on one side between the main portion of the cutter 30 and the cutting portion 34 to form tab portions 39 which are bent inward to give a flattened surface. The end face 41 of the cutter portion 34 is formed at an angle with respect to the axis and at the edge away from slot 37 intersects the outer cutting surface 35 to form a sharp cutting edge indicated at 42. The edge between the tab portions 39 and the end face 41 is formed with a rounded edge portion 43 to prevent any cutting of the diaphragm at this point.

The second or male fitting member 44 includes an insert 45 which is provided in its one end with a bore 47 to receive a tube 46 which may be secured to the insert 45 by means of solder as indicated at 48. The outer periphery of insert 45 is formed with a cylindrical portion 49 overlying the tube bore 47. A first conical shoulder 51 is formed on the outer surface of the insert 45 adjacent the cylindrical portion 49, and an oppositely facing conical shoulder 52 is formed adjacent the tapered nose 54. This long nose portion 54 of the insert is also formed with a taper of approximately two degrees away from the shoulder 52. A nut 56 is mounted on the insert 45 and has an internally threaded portion 57 adapted to engage the threaded portion 15 on the body 12. A conical shoulder 58 is provided on nut 56 to engage the shoulder 51 on insert 45 to force the insert into engagement with the body 12 while providing a centering action for the insert with respect to the body 12.

The tapered nose 54 has a relatively thin wall defined on its inner surface by the main bore 61. At the forward end of the main bore 61, the insert has a reduced bore 62 to give added wall thickness at this point in view of the reduced diameter of the tapered nose 54. A diaphragm 64 preferably formed integrally with the insert 45 extends across the reduced bore 62 to close off the reduced bore. It should be noted that the reduced bore 62 has a diameter slightly greater than the maximum diameter of the sharp cutting edge portion 42 of the cutter 30. An axially projecting annular edge 66 is formed on tapered nose 54 outward of diaphragm 64 and has an outer diameter substantially equal to that of the bore 13 in body 12.

It will be seen that when the coupling members are assembled on their respective tubes, the two diaphragms 23 and 64 close off the tubes to provide sealed systems. When the coupling is assembled, the nut 56 is threaded onto the threaded portion 15 of body 12 and relative movement of these members causes the tapered nose 54 on insert 45 to fit within the bore 13. When the tapered nose 54 has entered the bore 13 a sufficient distance to allow the annular edge 66 to come into contact with the diaphragm 23, the outer surface of tapered nose 54 has a diameter slightly greater than that of the rounded edge portion 25 so that this rounded edge portion slightly swages the tapered nose 54 inward and makes metal-to-metal sealing contact at this point.

Figure 2:
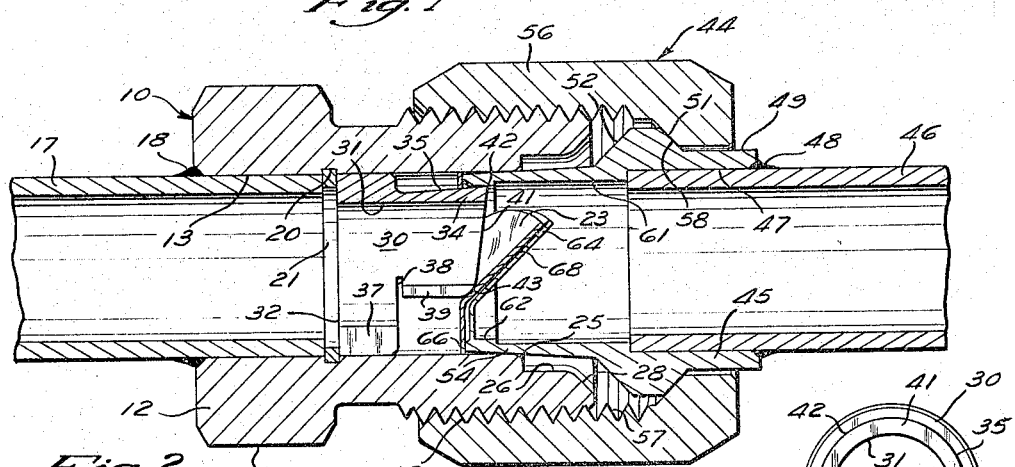
FIGURE 2 is a cross-sectional view of the coupling of FIGURE 1 showing the coupling members partially assembled.
Figure 3:
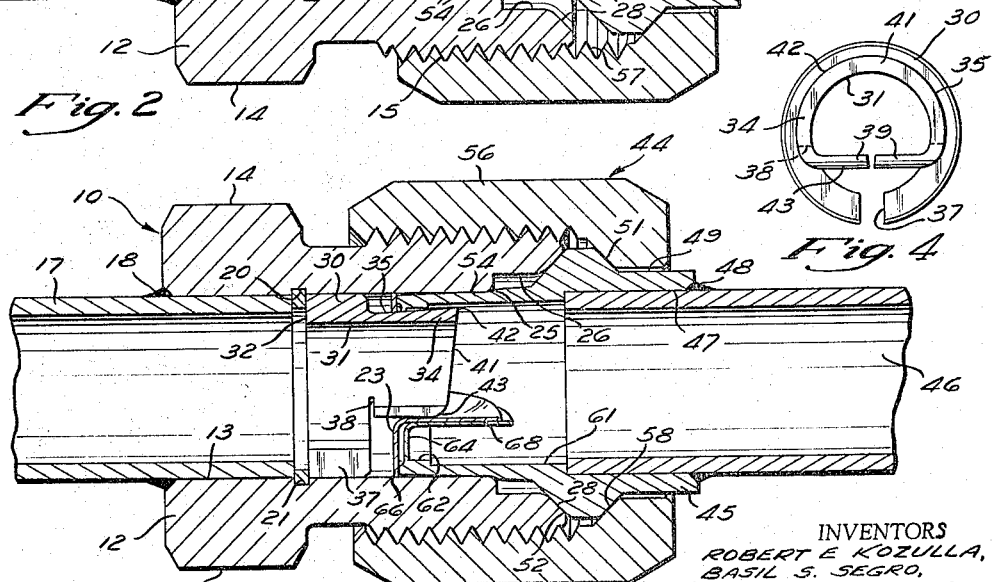
FIGURE 3 is a cross-sectional view of the coupling members of FIGURES 1 and 2 showing the coupling in the fully assembled position.

Further movement of the insert 45 causes the annular edge 66 on the tapered nose 54 to shear the diaphragm 23 around its outer periphery adjacent the wall of bore 13. As the diaphragm 23, now completely severed from the body 12, is moved inward it is moved against the cutter 30 so that the sharp edge 42 starts to shear through the diaphragm 23. Since the annular edge 66 has a relatively short axial extent, there is only a very slight space of trapped air between the two diaphragms 23 and 64 and after the cutter has started to shear the diaphragm 23, further movement of the insert causes the cutter to also shear the other diaphragm 64 to cause them to bend backwards toward the interior of the insert as shown in FIGURE 2. Because of the slope of the end face 41, the shearing action on the two diaphragms is progressive and causes the sheared portions indicated at 68 to be deflected inwardly. Since the tab portions 39 have a rounded edge 43, no cutting will be done at this point and the sheared portions 68 will then bend until they reach the position shown in FIGURE 3 when the coupling is fully assembled.

In this position the sheared portion 68 no longer block the coupling bores and allow free passage through the two coupling members and through the cutter 30. It should be noted that because of the taper of the cutting portion 34 and the taper on the tapered nose 54, a continued and progressive swaging effect will take place on the tapered nose 54 as it engages the rounded portion 25. To provide clearance and prevent binding at this point, relief is provided by the tapered outer surface of cutting portion 34, since the annular edge 66 and reduced bore 62 continue to be constricted somewhat by the reduction in diameter of the tapered nose at shoulder 25. Since these portions of the inset will not bind against the cutter, the only forces resisting the tightening of the two coupling members are those required to shear the diaphragms 23 and 64 and that provided by the sealing engagement between the rounded edge 25 and the tapered nose 54. Since the nose 54 is tapered throughout its entire length, continued constriction of the forward edge after it has passed into the bore 13 does not cause any release of the sealing engagement since the seal is maintained by the continued resistance required to swage the tapered nose 54 into the reduced diameter so that it may enter the bore 13.

After the coupling has been completely assembled, an additional metal-to-metal seal is provided between the conical shoulder 52 on insert 45 and the flared conical mouth 28 on body 12. Thus, when the coupling is completely assembled there is a metal-to-metal seal both between the tapered nose 54 and the rounded portion 25 and between the conical shoulder 52 in the flared portion 28.

Although the preferred embodiment of this invention has been shown and described in detail, it is recognized that various modifications and rearrangements will readily occur to those skilled in the art and such modifications and rearrangements may be resorted to without departing from the scope of the invention as defined in the claims.

What is claimed is:

1. A coupling comprising first and second coupling members, each of said coupling members having an axial bore therein, means to move said coupling members toward each other into coupled position with their respective bores in axial alignment, a diaphragm on one of said coupling members normally extending across the bore of said coupling member in sealing relationship, a cutter member carried by one of said coupling members, and arranged to cut through said diaphragm to permit fluid flow through said bores when said coupling members are secured together in said coupled position, a substantially rigid, nondeformable, circular surface on said first member, a deformable nose on said second member adapted to telescope with said circular surface with an interference fit as said coupling members move to said coupled position, said telescoping causing said circular surface to progressively deform said nose providing a metal-to-metal sliding seal between said coupling members prior to the cutting of said diaphragm and maintaining said metal-to-metal sliding seal as said coupling members move to said coupled position to prevent leakage of fluid within said coupling from between said coupling members.

2. A coupling as set forth in claim 1 wherein said nose is formed with a taper sized at its forward end to freely telescope with said circular surface and providing increasing interference and deformation of said nose as said coupling members move to said coupled position.

3. A coupling as set forth in claim 1 wherein a diaphragm is provided on each of said coupling members and said cutter member is arranged to cut through both of said diaphragms in response to movement of said coupling members to said coupled position.

4. A coupling as set forth in claim 3 wherein said cutter is on said second member, said circular surface is an internal surface on the side of said diaphragm in said second coupling member remote from said cutter member, and said nose telescopes into said circular surface, said nose member operating to engage and move said diaphragm in said second coupling member against said cutter member in response to said movement of said coupling members to said coupled position.

5. A coupling comprising first and second coupling members, each of said coupling members having an axial bore therein, means to move said coupling members together into coupled relationship with their respective bores in axial alignment, a diaphragm on one of said coupling members normally extending across the bore of said coupling member in sealing relationship, a deformable tapered nose on the other of said coupling members adapted to enter the bore of said one member, a diaphragm on said tapered nose normally extending across the bore of said other coupling member in sealing relationship, a cutter member carried by said one coupling member and arranged to cut through said diaphragms on both of said coupling members to permit fluid flow through said bores when said coupling members are secured together in sealing relationship, said tapered nose also engaging and telescoping with a substantially rigid circular surface on said one coupling member with an interference fit, said nose being deformed by engagement with said circular surface and establishing a resilient metal-to-metal sliding seal between said coupling members prior to the cutting of said diaphragms and maintaining said metal-to-metal sliding seal as said coupling members move to said coupled relationship to prevent leakage of fluid within said coupling from between said coupling members.

6. A coupling comprising first and second coupling members, each of said coupling members having an axial bore therein, means to move said coupling members together into coupled relationship with their respective bores in axial alignment, a diaphragm integral with one of said coupling members normally extending across the bore of said one coupling member in sealing relationship, a cutter member carried by said one coupling member on the side of said diaphragm away from the other coupling member, said other coupling member having a tapered nose portion adapted to enter the bore of said one coupling member, an axially projecting annular edge on the end of said tapered nose adapted to engage said diaphragm to shear it from said member and force it against said cutter member to cut through said diaphragm to permit fluid flow through said bores when said coupling members are secured together in sealing relationship, said tapered nose also engaging and telescoping into a substantially rigid circular surface on said one coupling member with an interference fit, said nose being progressively deformed to provide a resilient metal-to-metal sliding seal between said coupling members prior to the cutting of said diaphragm and while said coupling members move to said coupled relationship to prevent leakage of fluid within said coupling from between said coupling members.

7. A coupling comprising first and second coupling members, each of said coupling members having an axial bore therein, means to urge said coupling members together into coupled relationship with their respective bores in axial alignment, a cutter member carried in the bore of one of said coupling members, a tapered nose on the other of said coupling members adapted to enter the bore of said one member, a diaphragm on said tapered nose normally extending across the bore of said other coupling member in sealing relationship, said tapered nose having a bore of reduced diameter adjacent said diaphragm on the side of said diaphragm away from said one coupling member to provide increased wall thickness of said tapered nose at this point, whereby when said coupling members are moved together with their respective bores in axial alignment said diaphragm is forced against said cutter member to cause said cutter member to cut through said diaphragm to permit fluid flow through said bores when said coupling members are secured together in sealing relationship, said tapered nose also engaging a substantially nondeformable circular surface on said one coupling member and being progressively deformed thereby to provide a resilient metal-to-metal sliding seal between said coupling members prior to the cutting of said diaphragm to prevent leakage of fluid within said coupling from between said coupling members as they move to said coupled relationship.

8. A coupling comprising first and second coupling members, each of said coupling members having an axial bore therein, means to urge said coupling members together into coupled relationship with their respective bores in axial alignment, a diaphragm integral with one of said coupling members normally extending across the bore of said one coupling member in sealing relationship, a tapered nose on the other of said coupling members adapted to enter the bore of said one member, a diaphragm on said tapered nose normally extending across the bore of said other coupling member in sealing relationship, said tapered nose having a reduced diameter portion adjacent said diaphragm on the side of said diaphragm away from said one coupling member to provide increased wall thickness for said tapered nose at this point, an axially projecting annular edge on the end of said tapered nose adapted to engage said integral diaphragm to shear it from said one member, a cutter member carried in the bore of said one coupling member, said cutter member having a cutting portion facing toward said diaphragms and adapted to cut through said diaphragms on both of said coupling members to permit fluid flow through said bores when said coupling members are secured together in sealing relationship, said tapered nose also engaging the bore, said one coupling member to provide a resilient metal-to-metal sliding seal between said coupling members prior to the cutting of said diaphragms to prevent leakage of fluid within said coupling from between said coupling members, said metal-to-metal seal being maintained as said members are moved into the fully coupled position by the continued swaging of said tapered nose to a reduced diameter by the end of said bore of said one member.

9. A coupling comprising first and second coupling members, each of said coupling members having an axial bore therein, said first coupling member having an externally threaded portion, said second coupling member comprising an insert and a nut, said nut having internal threads adapted to engage the external threads on said first coupling member, said insert having a first shoulder facing away from said first coupling member, said nut having a shoulder engaging said first insert shoulder to force said insert toward said first coupling member, a retaining ring in the bore of said first coupling member, a diaphragm integral with said first coupling member extending across the bore thereof a spaced distance from said retaining ring, said first coupling member having a rounded shoulder on the end of said bore outward of said diaphragm, said first coupling member having a flared conical surface outward of said rounded shoulder, a cutter member positioned within the bore of said first coupling member intermediate said retaining ring and said diaphragm, said cutter member having a generally tubular cutting portion flaring with an increasing outer diameter toward said diaphragm, said cutting portion having an end surface oblique to the axis defined by said coupling members, said end surface defining a sharp cutting edge at the portion adjacent said diaphragm, said cutting portion having a flattened portion diametrically opposite the portion nearest said diaphragm, said flattened portion having a rounded edge, said insert having a tapered nose portion adapted to enter the bore of said first coupling member, an integral diaphragm on said tapered nose at the end thereof extending across the bore of said insert in sealing relationship, said tapered nose having a reduced bore portion adjacent said diaphragm on the side of said diaphragm away from said first coupling member to provide increased wall thickness at this point, an axially projecting annular edge on the end of said tapered nose, said annular edge having a diameter substantially equal to that of the bore in said first coupling member and adapted to engage said integral diaphragm on said first coupling member to shear it from said member and force it against said cutter member whereby continued movement of said coupling members toward each other causes both of said diaphragms to be cut through by said tubular cutting portion and deflected inward of said second coupling member to provide a free fluid passage through the bores of said coupling members when said coupling members are fully secured together in sealing relationship, said tapered nose also engaging the rounded shoulder on the bore of said first coupling member to provide a resilient metal-to-metal sliding seal between said coupling members prior to the cutting and shearing of said diaphragms to prevent leakage of fluid within said coupling from between said coupling members, said metal-to-metal sliding seal being maintained by continued swaging of said tapered nose by reduction in diameter by said rounded shoulder to maintain said sliding seal at all times until said coupling members are in the fully coupled position, and a second shoulder on said insert engageable with said flared conical surface on said first coupling member when said coupling members are in the fully engaged position to provide a second metal-to-metal seal between said coupling members outward of said metal-to-metal sliding seal.

References Cited by the Examiner

UNITED STATES PATENTS

| | | | |
|---|---|---|---|
| 2,127,611 | 8/1938 | Mueller | 285—382.7 |
| 2,507,379 | 5/1950 | Morrison | 285—3 |
| 2,933,333 | 4/1960 | Bredtschneider et al. | 285—354 |
| 3,058,750 | 10/1962 | Taylor. | |
| 3,202,442 | 8/1965 | Abbey et al. | 285—3 |

CARL W. TOMLIN, *Primary Examiner.*

T. A. LISLE, *Assistant Examiner.*